United States Patent
Amir et al.

(10) Patent No.: US 10,794,987 B2
(45) Date of Patent: Oct. 6, 2020

(54) HYBRID IR-US RTLS SYSTEM

(71) Applicant: CenTrak, Inc., Newtown, PA (US)

(72) Inventors: Israel Amir, Princeton, NJ (US); Tal Singer, Newtown, PA (US)

(73) Assignee: CenTrak, Inc., Newtown, PA (US)

( * ) Notice: Subject to any disclaimer, the term of this patent is extended or adjusted under 35 U.S.C. 154(b) by 0 days.

(21) Appl. No.: 15/895,735

(22) Filed: Feb. 13, 2018

(65) Prior Publication Data

US 2018/0188352 A1    Jul. 5, 2018

Related U.S. Application Data

(63) Continuation-in-part of application No. 15/832,393, filed on Dec. 5, 2017.

(60) Provisional application No. 62/497,852, filed on Dec. 5, 2016.

(51) Int. Cl.
  *G01S 5/26* (2006.01)
  *G01S 5/16* (2006.01)
  *G01S 11/16* (2006.01)
  *G01S 5/30* (2006.01)

(52) U.S. Cl.
  CPC ........ *G01S 5/26* (2013.01); *G01S 5/16* (2013.01); *G01S 5/30* (2013.01); *G01S 11/16* (2013.01)

(58) Field of Classification Search
  CPC ..... G01S 5/26; G01S 5/16; G01S 5/30; G01S 11/16
  USPC .......................................................... 340/8.1
  See application file for complete search history.

(56) References Cited

U.S. PATENT DOCUMENTS

| | | | | |
|---|---|---|---|---|
| 4,758,691 A | * | 7/1988 | De Bruyne | G01S 5/30 178/18.09 |
| 5,999,167 A | * | 12/1999 | Marsh | G06F 3/0346 345/158 |
| 6,150,948 A | * | 11/2000 | Watkins | G06K 7/0008 340/693.3 |
| 7,522,049 B2 | | 4/2009 | Aljadeff et al. | |
| 7,525,050 B1 | * | 4/2009 | Weaver | G06F 3/0433 178/18.04 |
| 8,604,909 B1 | | 12/2013 | Amir et al. | |
| 2003/0142587 A1 | | 7/2003 | Zeitzew | |
| 2004/0113805 A1 | * | 6/2004 | Fardin | G01S 11/16 340/686.2 |
| 2005/0046584 A1 | * | 3/2005 | Breed | B60C 11/24 340/13.31 |
| 2005/0246112 A1 | * | 11/2005 | Abhulimen | F17D 5/02 702/51 |
| 2010/0281261 A1 | | 11/2010 | Razzell | |

(Continued)

OTHER PUBLICATIONS

Non-Final Office Action received for U.S. Appl. No. 15/832,393, dated Oct. 12, 2018, 6 pages.

*Primary Examiner* — Allen T Cao
(74) *Attorney, Agent, or Firm* — KAPLAN BREYER SCHWARZ, LLP

(57) ABSTRACT

A hybrid infrared-ultrasound real time location system includes at least one emitter having an infrared transmitter and a plurality of ultrasound transmitters and at least one tag. The tag receives an infrared signal from the infrared transmitter and ultrasound signals from the ultrasound transmitters. The time between the time-of-arrival of the IR signal and the time-of-arrival of each ultrasound signal is calculated and used to measure the respective time-of-flight of each of the US transmissions from the US transmitters to the tag and compute location.

22 Claims, 6 Drawing Sheets

(56) References Cited

U.S. PATENT DOCUMENTS

| | | | |
|---|---|---|---|
| 2011/0196580 A1* | 8/2011 | Xu | B60K 35/00 |
| | | | 701/48 |
| 2012/0087507 A1 | 4/2012 | Meyer | |
| 2012/0094683 A1 | 4/2012 | Yoeli | |
| 2013/0297690 A1 | 11/2013 | Lucero et al. | |
| 2014/0003194 A1 | 1/2014 | Klose et al. | |
| 2015/0292879 A1 | 10/2015 | Zhou et al. | |
| 2015/0348060 A1* | 12/2015 | Ogawa | G06Q 30/02 |
| | | | 705/7.29 |
| 2016/0291116 A1 | 10/2016 | Horie et al. | |
| 2017/0284971 A1* | 10/2017 | Hall | G01B 17/02 |
| 2018/0005183 A1* | 1/2018 | Nguyen | G06Q 10/0836 |
| 2018/0199171 A1* | 7/2018 | Annamalai | G01S 1/042 |

* cited by examiner

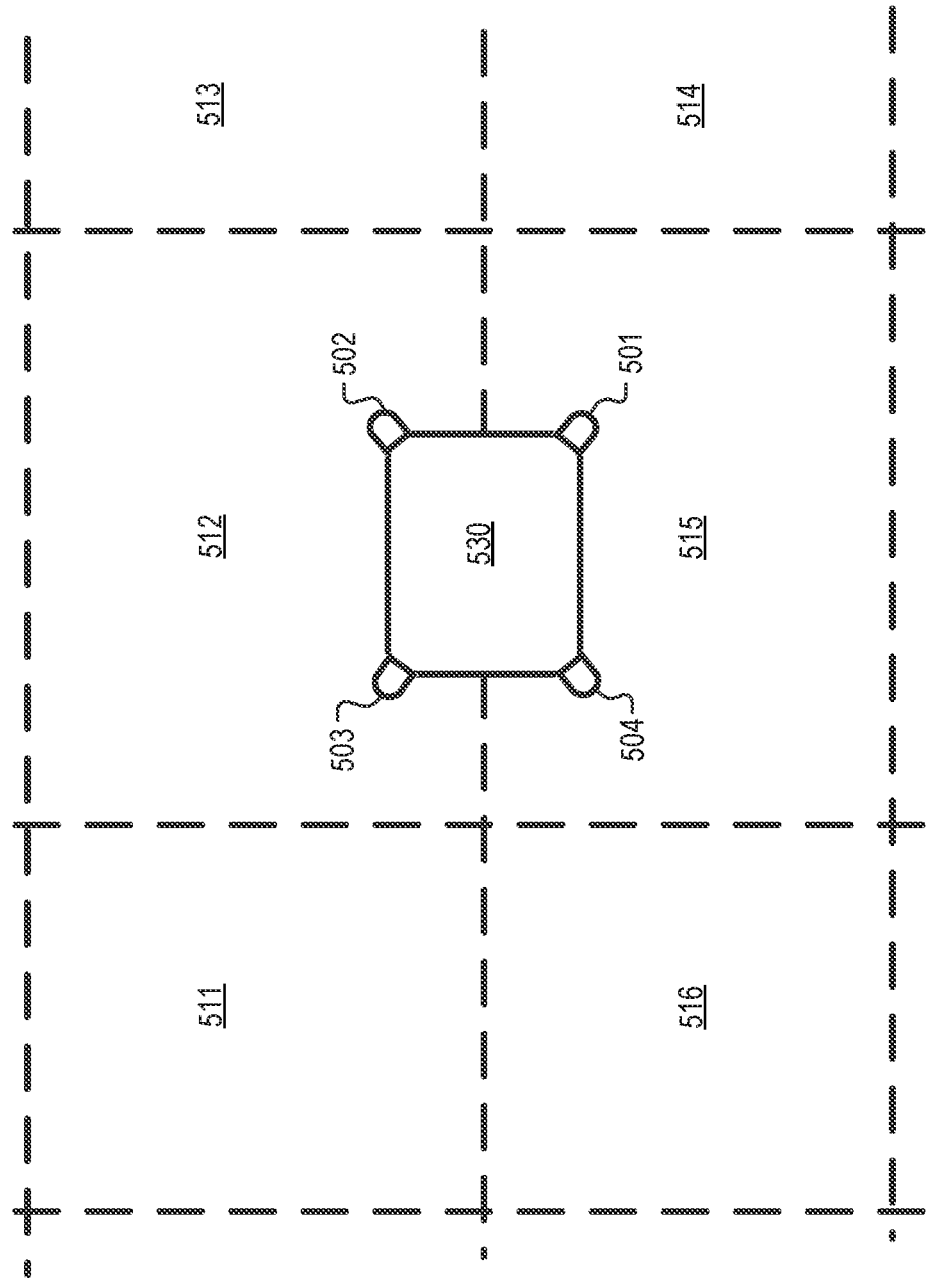

HYBRID IR-US RTLS SYSTEM

STATEMENT OF RELATED CASES

This case claims priority of U.S. provisional patent application 62/497,852, which was filed Dec. 5, 2016 and is incorporated by reference herein. This application is also a continuation-in-part of, and claims priority to, U.S. application Ser. No. 15/832,393.

FIELD OF THE INVENTION

This invention pertains generally to indoor real time location systems.

BACKGROUND OF THE INVENTION

Real-time location (RTL) systems have become popular in recent years. Some conventional RTL systems typically use radio frequency (RF) transmissions between a portable tag attached to an asset and plural fixed points to determine location via a trilateration method. Other known RTL systems include fix mounted infrared (IR) or ultrasonic (US) base stations that transmit an ID code using a secondary technology such as infrared (IR) or ultrasound (US) signals. The IR or US signal includes a respective base station ID. Upon reception of a base station ID, the portable tag transmits both the portable tag ID and the received emitter ID ("location data") to a network access point, for example, by wireless RF transmission such as Wifi 802.11. The access point forwards the received information to a server that uses the transmitter device ID and the portable tag ID to determine the location of an asset to which the portable tag is attached.

Prior patents discussing the foregoing techniques include, for example, U.S. Pat. Nos. 8,604,909, and 7,522,049, the teachings of both of which are hereby fully incorporated by reference.

It is an object of the present invention to obtain the benefits associated with both types of RTLS in order to accurately locate assets.

SUMMARY OF THE INVENTION

The present invention provides a new approach to RTLS wherein IR (or RF) is used for ID communications and US is used for "delineation" information—to measure distances. For purposes of explanation herein, we use IR for the ID communications in the exemplary embodiment described below, with the understanding that RF may be substituted therefor.

In accordance with the illustrative embodiment of the present invention, an estimate is obtained of the time difference between the time-of-arrival of the IR signal (i.e., essentially immediate as it travels at the speed of light) and the time-of-arrival of the US signal, which propagates at a speed of about 300 meters/second in air. Since the relative transmission times of the IR and US signals from the emitter are known, the time of arrival of the US signal can be translated into a distance. The use of the multiple distances can then be translated into a location.

In some embodiments, an IR transmitter (e.g., a base station) transmits a periodic IR beacon with multiple associated US transmitters that transmit US signals with a known time relationship to the IR transmissions. A tag includes both IR receiver and US receivers so that it can receive both the IR signal and the multiple US signals. Based on the time relationship of the respective transmissions of the IR signals and the US signals, the tag can measure the respective time-of-flight of each of the US transmissions from the US transmitters to the tag and compute the distance from the base-station. The method works because IR signals propagate at the speed of light, and thus, the time they take to propagate from the emitter to the tag's IR receiver is essentially zero relative to US, which propagates at 300 meters per second.

In certain embodiments, the design is simplified by using two ultrasonic transducers and locating a plane in which the tag is located. In other embodiments, multiple distances using multiple transducers may be employed to locate an asset in three dimensional space.

BRIEF DESCRIPTION OF THE DRAWINGS

FIG. 3C depicts an illustrative embodiment of an emitter device showing virtual walls resulting from the use of four US transducers.

DETAILED DESCRIPTION

Figure 1:
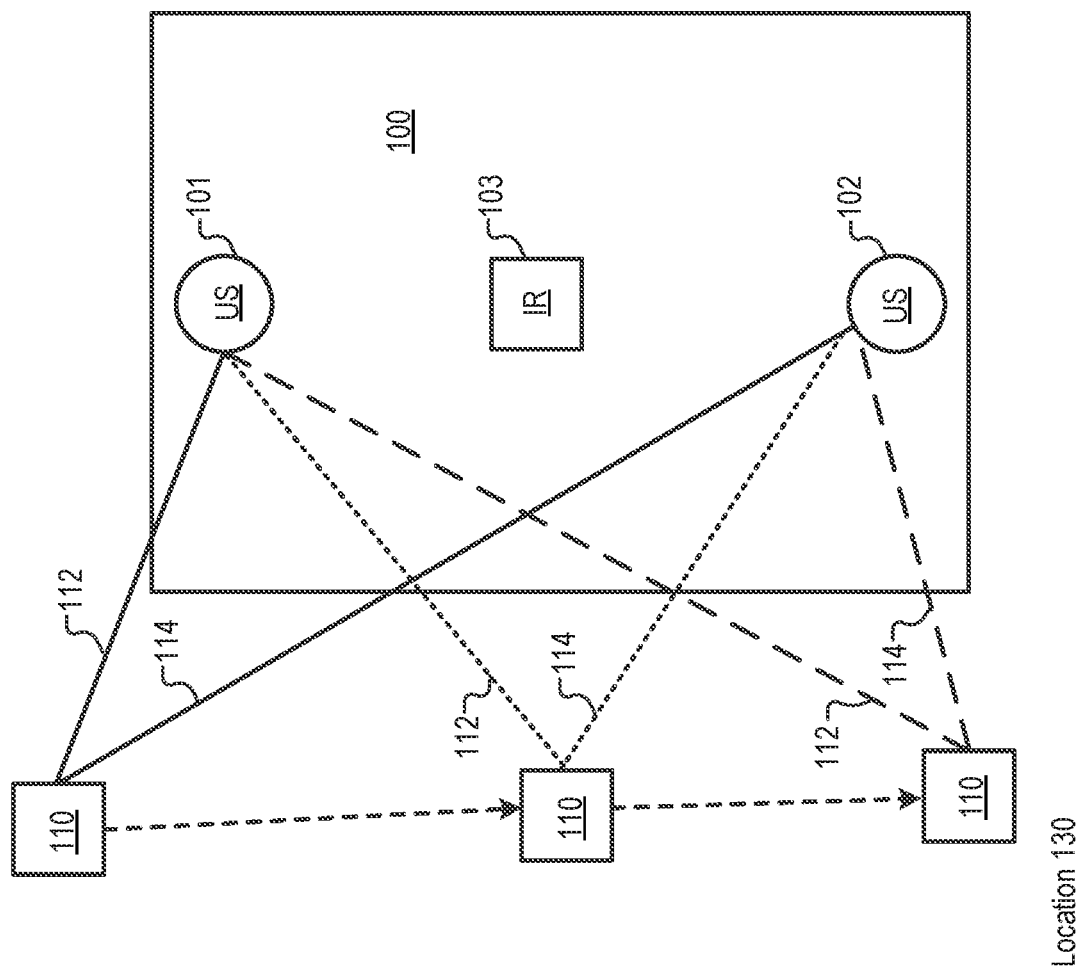
FIG. 1 depicts an illustrative embodiment of an emitter device for use in the present invention.

FIG. 1 depicts an emitter 100 comprising at least two ultrasound transmitters 101 and 102. An emitter is typically mounted at a known fixed location in a facility in which assets are to be located, such as a hospital. U.S. Pat. No. 8,604,909 described the use of US or IR emitters in a similar manner, although such prior art emitters do not have the full functionality of the emitter described herein.

In operation, the emitter 100 transmits an IR signal from the IR transmitter 103. Preferably, the IR signal transmitted is modulated such that an identification ("ID") associated with that particular emitter 100 location is included in the IR signal. The IR signal may be transmitted periodically in accordance with a prescribed schedule, or at chosen non-fixed intervals.

A tag 110 is located in the vicinity of the emitter 100 and may be moved to potentially three different locations as shown. In any location in the vicinity of emitter 100, the tag may detect the IR signal, including the identification of the emitter 100 transmitting it. Once the IR signal is detected, the tag will subsequently detect ultrasound signals transmitted from each of the two ultrasonic transmitters 101 and 102. Assuming the US signals are transmitted simultaneously with the IT transmission, the tag 110 may utilize the time of arrival difference between the IR signal and each of the two US signals to calculate the length of line segments 112 and 114 as shown. Note that each US transmitter 101 and 102 may carry its own identification information, or may be on a unique frequency, or include other identifying information so that the system can determine from which US transmitter each US signal originates.

The manner in which the two US transmitters are arranged (i.e., vertically) enables the estimation of height anywhere in the area under coverage. The estimation holds anywhere around the vertical axis. This is because, as can be seen from FIG. 1, as the tag 110 is moved from the top of FIG. 1 to the bottom (i.e.; position 130), the distance represented by line segment 112 will get longer and line segment 114 will become shorter.

More generally, it can be shown that using two ultrasound transmitters, the system can detect which plane in which the tag is located for all planes perpendicular to the direction of the line segment connecting the two ultrasound transmitters and perpendicular to a line segment running directly into and out of the page on which FIG. 1 is drawn. If the US and IR transmissions occur at different times, that time difference can be accounted for and the same distances calculated.

The US transmitters can be arranged horizontally, instead of vertically as shown, or can be arranged at any other orientation.

The embodiment of FIG. 1 utilizes two US transmitters 101 and 102, arranged vertically and contained in an emitter mounted on a wall in a hospital room, for example. Alternatively, the embodiment of FIG. 2 includes three ultrasound transmitters 201-203, and can thus determine the position of the tag 203 in all three dimensions. More specifically, it can be shown that line segments 216, 218, and 220 can be used to determine the location of tag 110 in three dimensional space using known trilateration techniques.

Figure 2:
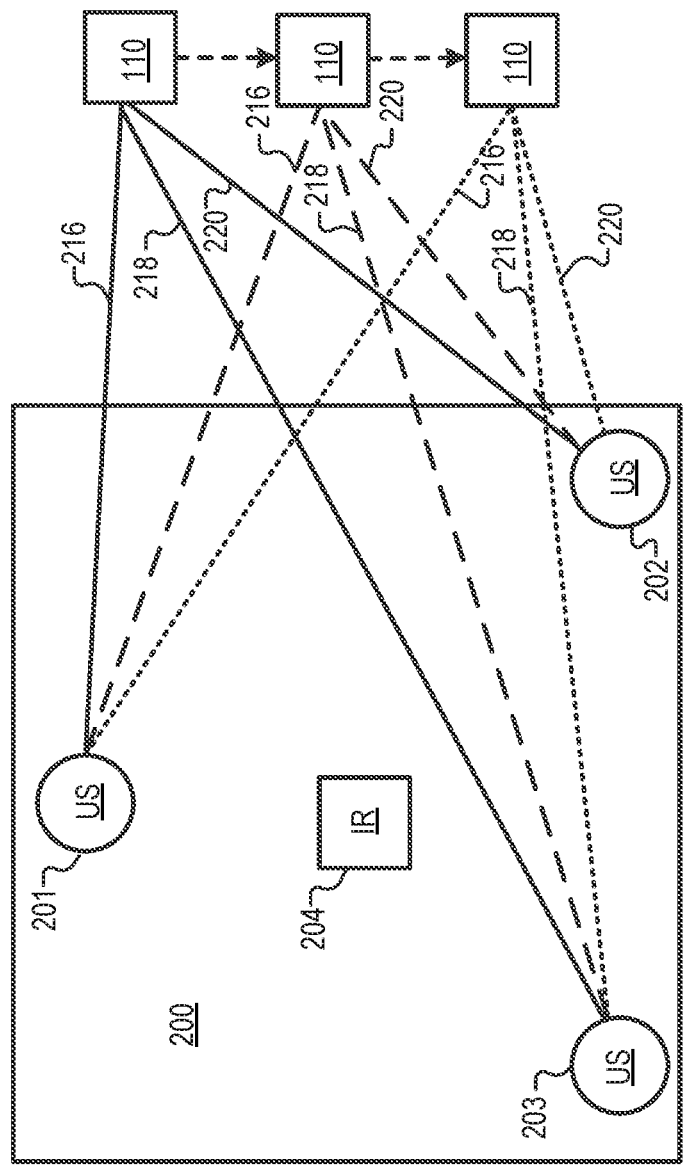
FIG. 2 depicts an illustrative embodiment of an emitter device including three US transducers and an IR transmitter in accordance with the present teachings.

By using three US transducers as shown in FIG. 2 and the same time of arrival difference calculation for each, an additional dimension in which the tag can be located is added when compared to FIG. 1. However, the complexity of the system is increased.

Whether two or three (or more) US transducers are used, the tag must have a manner in which to know which signal comes from which transmitter. This can be done by separating the US transmission by time or by frequency, by including an ID number in each US signal that identifies the US transmitter from which the signal originates, or in more complex embodiments, using different codes (e.g.; orthogonal codes for separating the signals) in each US signal that can be distinguished.

In some embodiments, the calculation of position may be performed at the tag itself. That is, the tag may determine the time of arrival difference between plural IR signals and respective US signals corresponding to such IR signals, perform distance calculations, and ultimately, the required trigonometric functions to locate the tag. Such location may then be transmitted via RF to an access point for forwarding to a network server.

In alternative embodiments, the tag may simply measure the time of arrival difference between an IR signal and the US signals, and forward the differences to the network for calculating position of the tag, for example, at a server. In this embodiment, when the differences are forwarded to the network, the forwarded information should also include identifying information for the tag. In other embodiments, the calculation of position may be distributed among various system elements. For example, the tag may use the above techniques to calculate multiple distances, and a server can then calculate positon from those distances sent to the server by the tag.

The IR and associated US signal need not originate substantially simultaneously. As long as there is a known timing relationship between each IR signal and its associated US signal, it can be accounted for.

Regardless of whether the position calculation is done at the tag or by another network element or some combination thereof, the location of the emitter 100 or 200 that transmitted the IR and US signals is required. Toward this end, the IR signal may be modulated to carry an ID that identifies the emitter with the subject IR transmitter and US transmitters. Since the system knows which emitters have been installed at which locations, this allows the tag (or any other network element in the system that does the calculations) to recognize the location from the calculated distances. In addition or alternatively, the US signals can also carry an emitter ID. Limiting the transmission of the emitter ID to IR makes the US transmitters much more efficient than having to transmit the ID on both US and IR.

In some embodiments, the IR transmissions are synchronized with tag IR reception such that the tag knows when to turn on the IR receiver and the US receivers in order to reduce power consumption. For example, if the room under coverage is 15 ft×15 ft, and the tag knows when the IR was transmitted and when the US signals were transmitted, the tag would need to turn on the IR receiver for the duration of the IR signal and the US receivers for about 15-20 milliseconds to capture the US signals, as the speed of propagation of the US signals is known and the maximum time for them to reach the US receiver is calculable.

FIGS. 3A through 3D show the use of an emitter with plural US transmitters which may be used to create virtual walls. A virtual wall may be used, for example, to divide one large area into plural "virtual rooms." As indicated by distances 309 and 311, US transmitters 301 and 302 may be used to locate where along a path from left to right in FIG. 3 a tag is located.

When a tag 320 is located as shown in FIG. 3, moving it rightward in FIG. 3 will decrease the difference between distances 309 and 311, and moving it leftward in FIG. 3 will increase said difference in distances 309 and 311. Accordingly, by programming the system with an appropriate threshold difference, a virtual wall can be created, subdividing a large space into smaller ones. Any difference in distances 309 and 311 above the threshold means tag 320 is in virtual room 350, whereas the difference being below the threshold means the tag 320 is in virtual room 360.

Figure 3A:
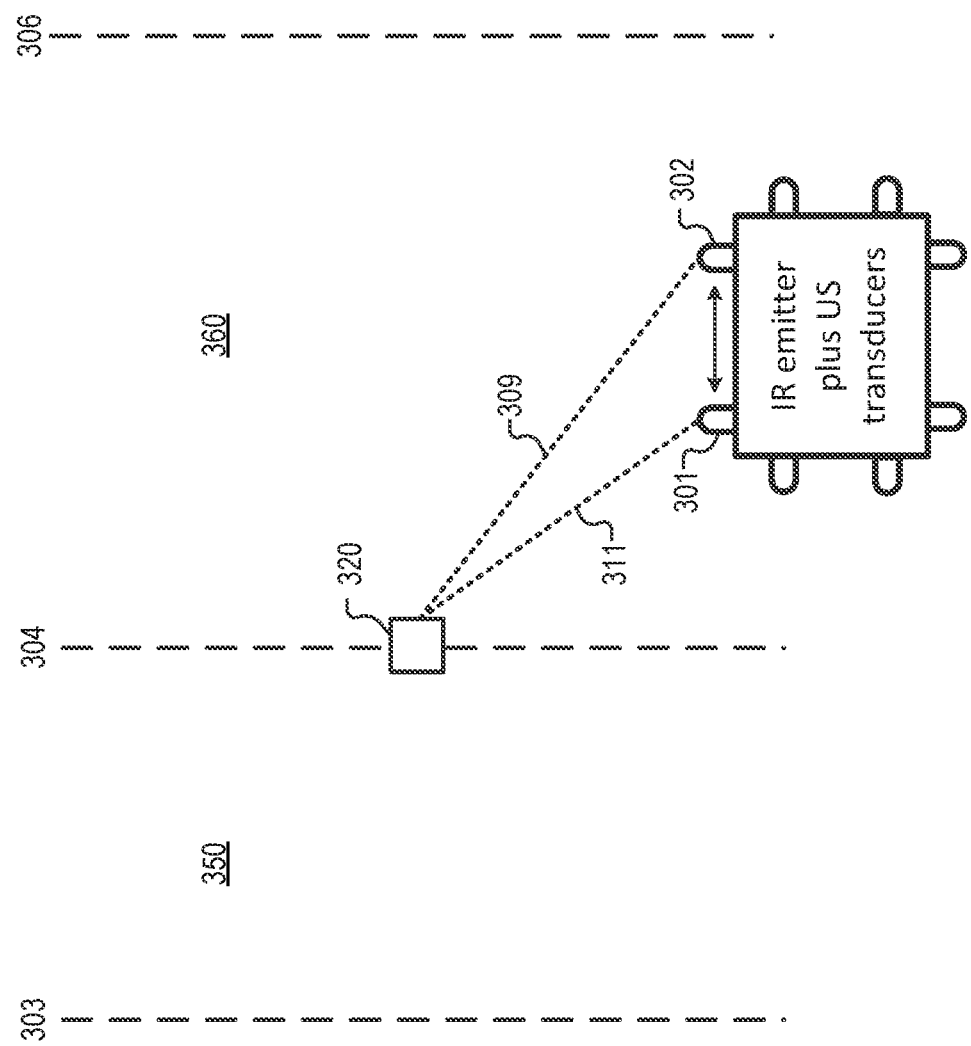
FIG. 3A depicts an illustrative embodiment of an emitter device showing how US transducers 1 and 2 create arbitrary virtual walls orthogonal to the line connecting the two US transducers.
Figure 3B:
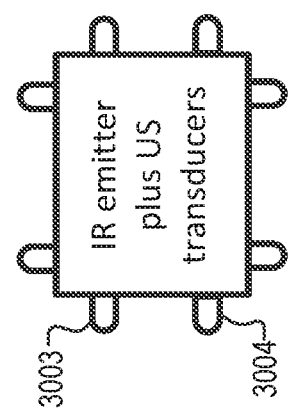
FIG. 3B depicts an illustrative embodiment of an emitter device showing how US transducers 3 and 4, which are disposed orthogonally to transducers 1 and 2 of FIG. 3A, create arbitrary virtual walls orthogonal to the line connecting US transducers 3 and 4.

FIG. 3b shows a similar embodiment, except this time the US transmitters 3003 and 3004 are utilized in a similar manner but in a direction perpendicular to that of FIG. 3a.

FIG. 3c shows still another alternative embodiment of an emitter 530 including four US transmitters 501-504. The embodiment of FIG. 3c allows efficient use of US transmitters 501-504 by allowing them to be reused in various combinations to create the shown virtual rooms 511-516.

Specifically, the techniques described above with respect to FIG. 3a can be used by US transmitters 502 and 501 in a similar manner to that described previously in order to determine if a tag is in virtual room 513 or 514. Similarly, ultrasonic transmitters 502 and 503 can be used to determine which of virtual rooms 511-513 in which a tag is located. US transmitters 503 and 504 can be used to determine which of virtual rooms 511 and 516 in which a tag is located, and US transmitters 501 and 504 correspond to virtual rooms 514-516.

By sequentially activating different pairs of the US transmitters 501-504, different sets of virtual walls and virtual rooms may be implemented. For example, the sequence of activation in FIG. 3c may be 501 and 502, followed by 503 and 504, followed by 502 and 503, and then 501 and 504.

Moreover, different sets of frequencies or different encoding can be used as each pair is activated.

Additional embodiments of the system described above may be utilized by combining the techniques described above.

Figure 3D:
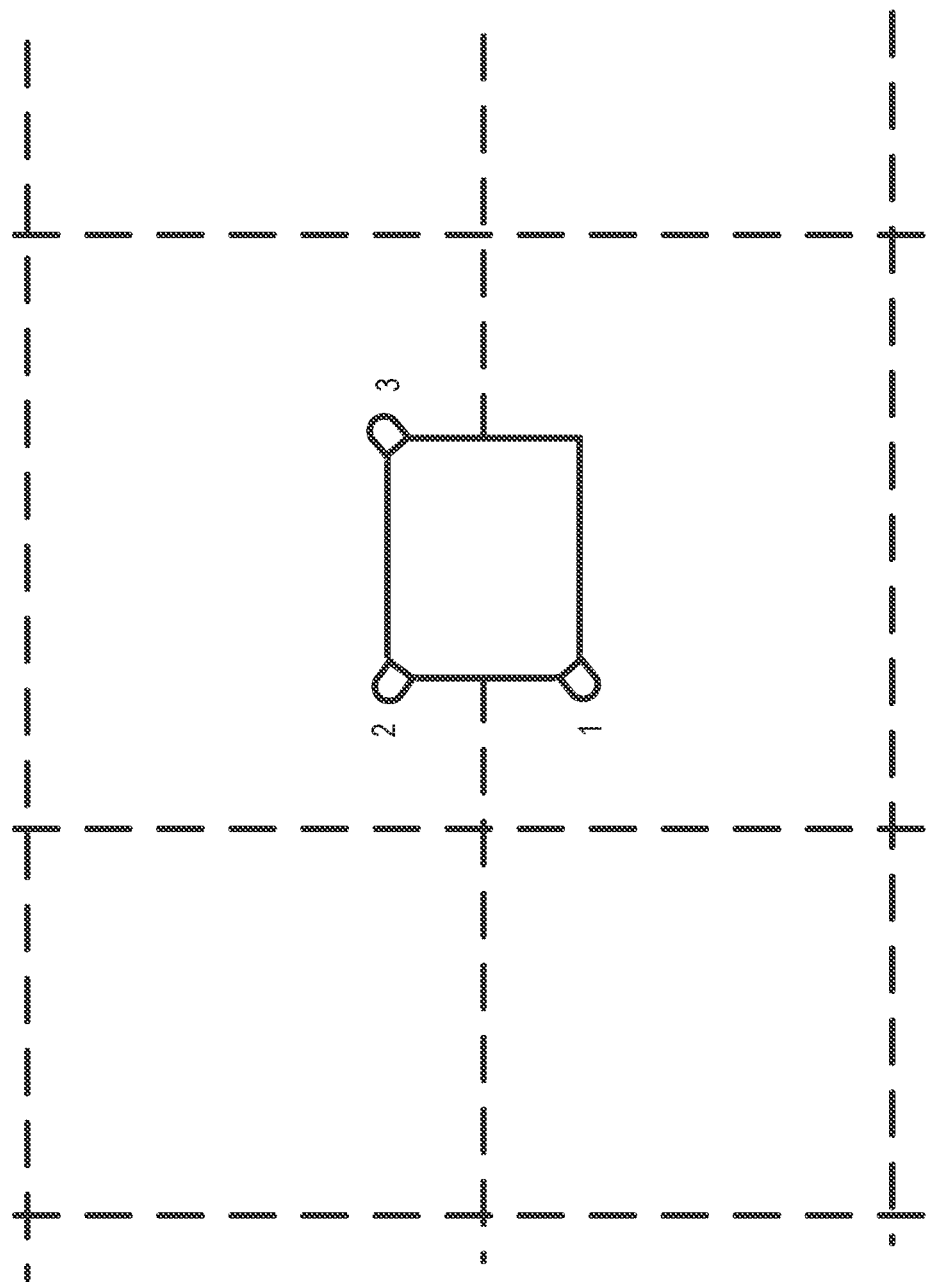
FIG. 3D depicts an illustrative embodiment of an emitter device showing virtual walls resulting from a minimal configuration of three US transducers.

In some embodiments, fewer transducers can be used (i.e., as few as three as shown in FIG. 3D), but it is often important for the main lobe of the transmission from the US transducers to be narrow with high gain. This increases the probability of direct reception by the tag versus secondary reflections from walls and other objects, which can cause signal loss and errors.

Even if a tag is facing away from the emitting base-station, the US signals will reach the tag's receiver with only slightly longer travel and not necessarily from reflection of nearby objects. Hence the necessity for sufficiently strong US signals. Thus, even in situations in which there is no direct line-of-sight and the signals are weakened, the tag's receiver will still be capable of receiving the US signals. The transmitted power can be increased, but this is problematic for battery-powered emitters. The gain from directional transmitters typically outweighs the penalty of increasing the number of transmissions. For example, transmitters gain can be as large as 10-20 dB higher when directional.

In addition to utilizing the above described system to locate the asset with which a tag is associated as described above, the system can also be used to locate the ultrasound transmitter that is closest to the tag. More specifically, if the US transmitters are synchronized to transmit the US signal at the same time as each other, then the tag can determine that the US signal received first by the tag is from the closest US transmitter. Alternatively, if the US signals are transmitted at different times, but the difference in transmission time is a known quantity, then the tag can still determine the closest US transmitter.

Some emitters may also contain a transceiver for bidirectional communication with the tags. In cases in which the tag is attempting to determine an emitter with which to associate for such communications, locating the closest emitter will enable the tag to transmit information to that closest emitter. This in turn, will provide for the most efficient communications between the tag and an emitter, which may then forward the tag's communication to the network.

To avoid collisions, the US signals from multiple US transmitters may be transmitted with a slight time offset so that the source of each signal is clear to the tag's receiver based upon timing. The time offset needs to consider the size of the zone to be covered and the time it takes for the US signals (typically short bursts) associated with each US transmitter to "die." Put another way, the time offset should be large enough so that if the tag receives two subsequent US signals, it can be sure that they are two subsequent transmissions from the US transmitters, and not a first transmission followed by an echo of that same first transmission.

A tradeoff must be struck between the time between US burst transmissions and the maximum speed that the tag can move before impacting accuracy and performance. That is, if the tag is moving very quickly, then waiting too long between transmissions of US signals will degrade the ability to locate the tag. This is because the two subsequently received US signals will be measured when the tag is at significantly different physical locations.

For tags moving at approximately 2-3 meters/second, separating US transmissions by approximately 30 milliseconds results in a successive US transmission not being confused by the system with echoes of a former US transmission, while still providing reasonably sufficient accuracy for location purposes in most typical environments in which the RTLS is to be used.

Alternatively, the US transmissions can be separated using different coding, or potentially different frequencies as indicated previously.

The system can also operate with multiple emitters, each of which contains one IR transmitter and one or more US transmitters. The system can also operate with emitters that contain multiple IR transmitters, (which can be pointing at different zones), each having multiple associated US transmitters. The location methodologies based upon calculations of distances as described above may be based upon US and IR signals originating from one or plural emitters.

In some embodiments, all the emitters are synchronized such that the US transmitters in portions or all of the RTL system are synchronized with each other. This is particularly advantageous when two different IR transmitters are designed to transmit the same IR identification, which is often done to increase the size of zone to that larger than what can be covered by one IR transmitter. In some other embodiments, two close IR transmitters (with their US transmitters) transmit the same emitter ID for the purposes of defining a left and right boundary to a zone.

Moreover, the distances calculated may be from different emitters, rather than using multiple US transmitters in one emitter as in the example above. That is, the tag (or other system element) may calculate the difference in time of arrival between an IR and US signal received from each of several emitters.

Note that synchronizing the transmitters or emitters does not necessarily mean that all US signals or IR signals are transmitted at the same time. Instead, it means that such transmissions are based off of synchronized timing so that such transmissions maintain a known timing relationship relative to one another.

In another embodiment, two emitters, each having a different emitter ID, are placed "back-to-back" such that the IR transmitters send their respective IDs in opposite directions. Each one of those emitters have associated US transmitters sending US signals essentially to the same direction as the respective IR transmitters.

In some embodiments, the IR transmitters may transmit their associated transmissions about every 30 milliseconds. In some other embodiments, the first US burst associated with the first IR transmitter transmits its burst at the same time the IR signal is transmitted and the second burst at about 30 milliseconds afterwards. The second IR transmitter transmits its ID 30 milliseconds after the first emitter ID is transmitted, with the associated US bursts following the same pattern as the first emitter.

In some additional embodiments, the US bursts can be transmitted at different times from the IR signals, but that time offset is known so the system can account for it when determining distances. Moreover, a known time relationship between the transmission of the IR and the US signals can be used determine which US signals are associated (i.e.; from the same emitter as) which particular IR signals.

In yet further embodiments, two emitters are placed near each other and pointing in essentially the same direction, each emitter having at least one US transmitter. In some embodiments, a tag or other system element can decipher on which side of the line to either left or right of the two base-stations, the tag is based on comparing the time-of-arrival of the signals from the US transmitters, the one on the left and the one on the right. This can also be achieved with a single emitter having two US transducers. Each time of arrival may be calculated by comparing the time of receipt of the US signal to the time of receipt of the IR signal.

In some other embodiments, differential time-of-arrival for the US pulses is used. Assume that the US transmitters' cycle in a known order (if they do not carry their own ID). The relative differential time-of-arrival is measured for each possible pair, and subtracting the known heartbeat rate will yield the closest emitter.

If, for example, the heartbeat is one second, we will have TOA of T1, T2, and T3 from, say, three emitters. The differences D1,2−1, D2,3−1 and D1,3−2 are calculated. The reason for the "−2" (seconds) is because the transmission between the first and the third pulses was set to exactly two seconds. Assume that D1,2−1 is larger than 0. This means that the US transmitter 1 is closer to the tag then US transmitter 2. D1,3−2 must be tested. If D1,3−2 is, for example, less than 0, it means that US transmitter 3 is closer to the tag than US transmitter 1. Therefore, US transmitter 3 is the closest US transmitter to the tag.

In some embodiments, the received signal strength indication (RSSI) of the received US bursts are used decide if one of the bursts is from a direct transmission and one is from a secondary reflection. In some embodiments, such an RSSI discrepancy will cause the receiver to drop the measurement.

In addition, if the time difference between the US bursts associated with the same IR transmitter exceeds the associated distance between the US transducers, it indicates that one of the bursts is a secondary reflection. In some embodiments, that will prompt the tag to drop the measurement.

In this specification, the functions of the IR transmitter and the US transmitter can be interchanged. That is, US can provide the same information provided by IR except for the length measurement from the time difference between the IR and US time-of-arrival. But, as will be clear to one skilled in the art, an additional US transducer can resolve this issue using differential times of arrival, and calculating the difference in receipt time at the tag of two US signals rather than of an US signal and an IR signal.

It is to be understood that the disclosure describes a few embodiments and that many variations of the invention can easily be devised by those skilled in the art after reading this disclosure and that the scope of the present invention is to be determined by the following claims.

What is claimed:

1. A method for determining a location of a tag in a real time location system, the method comprising:
   receiving, at the tag, an infrared signal from an infrared transmitter;
   receiving, at the tag, a first ultrasound signal from a first ultrasound transmitter and a second ultrasound signal from a second ultrasound transmitter;
   determining a first time difference between a time-of-arrival at the tag of the infrared signal and a time-of-arrival at the tag of the first ultrasound signal;
   determining a second time difference between the time-of-arrival at the tag of the infrared signal and a time-of-arrival at the tag of the second ultrasound signal;
   computing a first distance between the tag and the first ultrasound transmitter based on the first time difference;
   computing a second distance between the tag and the second ultrasound transmitter based on the second time difference; and
   estimating the location of the tag based on the first distance and the second distance.

2. The method of claim 1 wherein the infrared transmitter, the first ultrasound transmitter and the second ultrasound transmitter are arranged collinearly.

3. The method of claim 1 wherein the tag comprises an ultrasound receiver, the method further comprising activating the ultrasound receiver after the receiving of the infrared signal.

4. The method of claim 1 wherein transmission of the infrared signal and transmission of the first ultrasound signal are initiated at different times.

5. The method of claim 1 wherein transmission of the infrared signal and transmission of the first ultrasound signal are initiated simultaneously.

6. The method of claim 1 wherein the estimating is by the tag.

7. The method of claim 1 wherein the infrared signal carries an identification of an emitter, the emitter comprising the infrared transmitter, the first ultrasound transmitter and the second ultrasound transmitter.

8. The method of claim 4 wherein transmission of the first ultrasound signal and transmission of the second ultrasound signal are initiated simultaneously.

9. The method of claim 5 wherein transmission of the first ultrasound signal and transmission of the second ultrasound signal are initiated simultaneously.

10. The method of claim 1 wherein transmission of the first ultrasound signal and transmission of the second ultrasound signal are initiated at different times.

11. The method of claim 10 wherein transmission of the infrared signal and transmission of the first ultrasound signal are initiated simultaneously.

12. The method of claim 1 wherein the first ultrasound signal and the second ultrasound signal are transmitted at different frequencies.

13. The method of claim 1 wherein the first ultrasound signal and the second ultrasound signal are transmitted using different and distinguishable codes.

14. The method of claim 1 wherein the tag comprises an infrared receiver, and wherein the tag turns on and off the infrared receiver based on at least one of: (i) a time, known by the tag, at which transmission of the infrared signal is initiated, (ii) a time, known by the tag, at which transmission of the first ultrasound signal is initiated, or (iii) a time, known by the tag, at which transmission of the second ultrasound signal is initiated.

15. A method for determining a location of a tag in a real time location system, the method comprising:
   receiving, at the tag, a first infrared signal from a first infrared transmitter and a second infrared signal from a second infrared transmitter;
   receiving, at the tag, a first ultrasound signal from a first ultrasound transmitter and a second ultrasound signal from a second ultrasound transmitter;
   determining a first time difference between a time-of-arrival at the tag of the first infrared signal and a time-of-arrival at the tag of the first ultrasound signal;
   determining a second time difference between a time-of-arrival at the tag of the second infrared signal and a time-of-arrival at the tag of the second ultrasound signal;
   computing a first distance between the tag and the first ultrasound transmitter based on the first time difference;
   computing a second distance between the tag and the second ultrasound transmitter based on the second time difference; and estimating the location of the tag based upon said first distance and said second distance.

16. The method of claim 15 wherein the first infrared signal carries an identification of a first emitter, the first emitter comprising the first infrared transmitter and the first ultrasound transmitter, and wherein the second infrared signal carries an identification of a second emitter, the second emitter comprising the second infrared transmitter and the second ultrasound transmitter.

17. The method of claim 15 wherein the tag comprises an ultrasound receiver, the method further comprising activating the ultrasound receiver after the receiving of the first infrared signal.

18. The method of claim 15 wherein transmission of the first infrared signal and transmission of the first ultrasound signal are initiated at different times.

19. The method of claim 15 wherein transmission of the first infrared signal and transmission of the first ultrasound signal are initiated simultaneously.

20. The method of claim 15 wherein transmission of the first ultrasound signal and transmission of the second ultrasound signal are initiated at different times.

21. The method of claim 15 wherein transmission of the first infrared signal and transmission of the second infrared signal are initiated at different times.

22. The method of claim 15 wherein the estimating is by an apparatus that is different than the tag.

* * * * *